US008064769B2

(12) United States Patent
Galli et al.

(10) Patent No.: US 8,064,769 B2
(45) Date of Patent: Nov. 22, 2011

(54) METHOD AND SYSTEM FOR HITLESS TUNABLE OPTICAL PROCESSING (75) Inventors: Paola Galli, Milan (IT); Silvia Ghidini, Milan (IT); Marco Romagnoli, Milan (IT); Luciano Socci, Milan (IT); Francesco Tassone, Milan (IT)

(73) Assignee: Mosaid Technologies Incorporated, Ottawa (CA)

( * ) Notice: Subject to any disclaimer, the term of this patent is extended or adjusted under 35 U.S.C. 154(b) by 740 days.

(21) Appl. No.: 11/922,563

(22) PCT Filed: Jun. 30, 2005

(86) PCT No.: PCT/EP2005/007085
§ 371 (c)(1),
(2), (4) Date: Dec. 20, 2007

(87) PCT Pub. No.: WO2007/003208
PCT Pub. Date: Jan. 11, 2007

(65) Prior Publication Data
US 2008/0253767 A1    Oct. 16, 2008

(51) Int. Cl.
*H04B 10/00* (2006.01)
(52) U.S. Cl. .......................................... 398/85; 398/83
(58) Field of Classification Search .................... 398/83, 398/85, 87
See application file for complete search history.

(56) References Cited

U.S. PATENT DOCUMENTS

| 4,768,850 | A * | 9/1988 | Moslehi et al. | 385/24 |
| 5,471,332 | A * | 11/1995 | Shiragaki et al. | 398/45 |
| 6,035,080 | A * | 3/2000 | Henry et al. | 385/24 |
| 6,212,315 | B1 * | 4/2001 | Doerr | 385/31 |
| 6,289,151 | B1 * | 9/2001 | Kazarinov et al. | 385/32 |
| 6,522,795 | B1 * | 2/2003 | Jordan et al. | 385/10 |
| 6,748,142 | B2 * | 6/2004 | Madsen | 385/49 |
| 6,834,141 | B1 * | 12/2004 | Sidick | 385/27 |
| 6,907,156 | B1 * | 6/2005 | Madsen | 385/24 |
| 6,928,209 | B2 * | 8/2005 | Su et al. | 385/24 |
| 6,956,991 | B2 * | 10/2005 | Madsen | 385/27 |
| 7,171,076 | B2 * | 1/2007 | Shibata | 385/32 |
| 7,343,095 | B2 * | 3/2008 | Zhang et al. | 398/82 |
| 7,496,253 | B2 * | 2/2009 | Chang et al. | 385/24 |
| 2002/0071151 | A1 * | 6/2002 | Zaacks et al. | 359/118 |
| 2003/0035172 | A1 * | 2/2003 | Chen et al. | 359/127 |
| 2003/0231826 | A1 * | 12/2003 | Boyd et al. | 385/27 |
| 2005/0031260 | A1 | 2/2005 | Madsen | |
| 2005/0271323 | A1 * | 12/2005 | Zhang et al. | 385/27 |
| 2007/0258714 | A1 * | 11/2007 | Little et al. | 398/76 |
| 2008/0253767 | A1 * | 10/2008 | Galli et al. | 398/45 |

FOREIGN PATENT DOCUMENTS

| EP | 637879 A1 * | 2/1995 |
| EP | 1 158 318 A2 | 11/2001 |
| EP | 1 158 318 A3 | 11/2001 |
| WO | WO 2007003208 A1 * | 1/2007 |

* cited by examiner

*Primary Examiner* — Agustin Bello
(74) *Attorney, Agent, or Firm* — Don R. Mollick (57) ABSTRACT A method for switching from a first optical path optically coupled to an optical processing device to a second optical path, the first and second optical paths optically connecting, in parallel configuration, a first optical switch to a second optical switch, according to the following steps: directing optical radiation comprising at least a fast operating wavelength through the first optical path to the optical processing device, which is tuned to the first operating wavelength; tuning a resonant all-pass filter optically coupled to the second optical path so as to match, at least at a wavelength adjacent to the first operating wavelength, a phase distortion introduced by the optical processing device on the optical radiation; synchronously actuating the first and the second optical switch so as to switch the optical radiation from the first optical path to the second optical path.

19 Claims, 8 Drawing Sheets

METHOD AND SYSTEM FOR HITLESS TUNABLE OPTICAL PROCESSING

CROSS REFERENCE TO RELATED APPLICATION

This application is a national phase application based on PCT/EP2005/007085, filed Jun. 30, 2005, the content of which is incorporated herein by reference.

FIELD OF THE INVENTION

The present invention generally relates to the field of optical communications, in particular to the field of optical communication systems including hitless tunable optical processing functionality, such as hitless tunable optical add and/or drop multiplexing (OADM) functionality.

BACKGROUND OF THE INVENTION

A common technique to increase the transmission capacity of today optical communication systems is wavelength division multiplexing (WDM), wherein a plurality of optical channels, each having a respective wavelength, are multiplexed together in a single optical medium, such as for example an optical fiber. The WDM channels may be closely spaced (dense WDM or DWDM, having typical channel separation of 100 GHz-about 0.8 nm- or 50 GHz-about 0.4 nm or less) or coarsely spaced (CWDM, having typical channel separation greater than 5 nm) or a combination thereof.

Optical networking is expected to be widely used in perspective optical communication field. The term 'optical network' is commonly referred to an optical system including a plurality of point-to-point or point-to-multipoint (e.g., ring) optical systems optically interconnected through nodes. In all-optical transparent networks few or no conversions of the optical signal into electrical signal, and then again in optical signal, occur along the whole path from a departure location to a destination location. This is accomplished by placing at the nodes of the optical networks electro-optical or optical devices which are apt to process the optical signal in the optical domain, with limited or no need for electrical conversion. Examples of such devices are OADMs, branching units, optical routers, optical switches, optical regenerators (reshapers and/or re-timers) and the like. Accordingly, the term 'optical processing' for the purpose of the present description is used to indicate any optical transformation given to an optical radiation, such as optical filtering, extracting a channel or a power portion of said channel from a set of WDM channels ('dropping'), inserting a channel or a power portion of said channel into a WDM signal ('adding'), routing or switching a channel or its power portion on a dynamically selectable optical route, optical signal reshaping, retiming or a combination thereof. In addition, optical systems, and at a greater extent optical networks, make use of optical amplifiers in order to compensate the power losses due to fiber attenuation or to insertion losses of the optical devices along the path, avoiding the use of any conversion of the optical signal into the electrical domain even for long traveling distances and/or many optical devices along the path. In case the WDM wavelengths are closely spaced (e.g. within about 30 nm bandwidth around 1550 nm), all channels are typically optically amplified together.

In optical systems, and at a greater extent in optical networks, a problem exists of processing one or more optical channels at the nodes minimizing the loss and/or the distortion of the processed optical channel(s), as well those of the optical channels transmitted through the node ideally without being processed. Advantageously, the optical processing node should be able to simultaneously process more than one channel, ideally nearly all the channels. In addition, it is highly desirable that the optical processing node is tunable or reconfigurable, i.e., it can change dynamically the subset of channels on which it operates. It is highly desired that while the processing node "moves" from the initial channels subset (A) to the destination channels subset (B), the channels different from A and B (hereinafter referred to as 'thru channels') remain unaffected by the tuning operation. In this case the component is defined as 'hitless'. In particular, the thru channels placed between one of the initially processed channels and the respective final channel after tuning should not be subject to an additional impairment penalty, called 'hit', by the tuning operation. The hit may include a loss penalty and/or an optical distortion such as phase distortion or chromatic dispersion.

For example, optical communication networks need provisions for partially altering the traffic at each node by adding and/or dropping one or several channels out of the total number. Typically, an OADM node removes from a WDM signal a subset of the transmitted channels (each corresponding to one wavelength), and adds the same subset with a new information content, said subset being dynamically selectable.

There are several additional concerns. The tunable optical processing node should not act as a narrow band filter for the unprocessed channels, since concatenation of such nodes would excessively narrow the channel pass bands. The tunable optical processing node should also have low transmission loss and low cost, since these important factors ultimately determine which technology is selected.

U.S. Pat. No. 6,035,080 discloses a reconfigurable add-drop optical multiplexer (R-ADM) including at least one reconfigurable add-drop unit that can add-drop one channel out of a large set by switching the light path through one of a set of fixed add-drop filters (ADF). The ADFs comprise a pair of Bragg reflecting waveguides coupled together by a pair of spaced apart 3 dB couplers. The selection among add-drop filters is done by sliding an integrated optic chip with the set of ADFs between input and output waveguides. The sliding chip switch by itself cannot be used to reconfigure the ADM because it will disrupt the signal traffic as the chip is slid from one ADF to another. Instead, before making this change, it is desirable to switch from the add-drop filter path to a bypass path that is off the sliding chip without losing any bit. Reconfiguration is done by switching from the add-drop filter path to a bypass path, changing to a different add-drop filter and then switching back. In cited patent, a bypass switch is described comprising a pair of waveguide paths connecting a pair of identical thermo-optic switches, each one comprising a pair of 3 dB couplers connected by a pair of waveguide arms. Arms in first path include heating element to control the arm optical path-length (and thus phase). Arms in second path can provide a phase shift of $\pi$ as compared with unheated arms in first path. In operation, the thermo-optic switches determine which path input light will take. During switching from one path to another, the lightwave separates into two paths, and these contributions interfere when the two paths come together again. Thus the transmission depends on the phase difference of the two paths. According to the cited patent, the phase delay of the bypass path is adjusted to maintain nearly maximum transmission during switching via a phase shifter placed in the bypass path. A number of such low loss reconfigurable ADM units can be put in series to independently add and drop that number of channels out of a larger set.

The Applicant has noted that the ADM described in the cited patent is not really hitless, in that there is a loss of about 1 dB in the channels neighboring the add-dropped channel during switching between the first and second paths (FIG. 11 of cited patent). An optical field with frequency near the stop band of the Bragg reflectors will undergo a phase change significantly different from a field with frequency far from the stop band (FIG. 10 of cited patent).

In patent application US 2005/0031260 it is described, with reference to FIG. 4, a variable optical delay line comprising a continuous delay element having two variable delay arms. The first arm comprises a 0 to T continuous delay and the second arm comprises both a 0 to T continuous delay and a fixed delay T.

The Applicant has found that there is a need for an optical communication system having optical processing functionality which is tunable and hitless. In particular, the hit loss during tuning should be less than or equal to 1 dB. Moreover, the optical processing node should leave unaltered the thru channels during tuning. In particular, it is desired that the optical processing node introduces no or low chromatic dispersion to the thru channels. In addition, the optical processing node should preferably leave unaltered the unprocessed channels during processing operation and should be low-loss, low-cost, fast tunable and/or broadband.

SUMMARY OF THE INVENTION

The Applicant has found a method and a system for optical transmission furnished of optical processing functionality which can solve one or more of the problems stated above. In particular these method and system comprise optical processing capabilities which are hitless and tunable. The solution of the present invention is simple, feasible and low cost.

The optical processing functionality according to the present invention is based on a scheme for hitless switching between two optical paths, such scheme comprising a first 1×2 optical switch (or tunable coupler) adapted to address the WDM signal from one input waveguide to one of two possible optical paths. A second 2×1 optical switch (or tunable coupler) synchronized with the first one is adapted to collect the WDM signal coming from said one of the two possible optical paths and to address it to an output waveguide. The switching function can be implemented using known approaches, such as Mach-Zehnder interferometers (MZI), variable Y branches, variable couplers, variable polarization rotators/splitters, etc. A tunable filter (processing device) is placed on the first of the two optical paths (operating path).

During the filtering operation of a given channel A, the first switch addresses substantially the whole WDM signal to travel through the operating optical path, and the second switch collects the WDM signal from said optical path and addresses it to output waveguide (State 1). Before starting the tuning operation of the tunable filter, the two switches are reverted, so that substantially the whole WDM signal is addressed (State 2) to the second optical path (bypass path). During the transition from State 1 to State 2 the WDM signal is split between the two possible optical paths and is recombined into the output waveguide, advantageously without any losses of power and, preferably, without any optical distortion.

The Applicant has found that it is important to keep a correct phase relation between the fraction of the WDM signal that travels through the first optical path and the fraction that travels through the second optical path, otherwise a non negligible amount of optical power that should be recombined by the second optical switch and addressed to the output waveguide, could be lost during the transition from State 1 to State 2.

The tunable optical filter along the first optical path typically introduces a perturbation in the phase response at the wavelengths adjacent to the filtered one.

The Applicant believes that a problem exists of maintaining the correct phase relationship between the two optical paths, especially at thru wavelengths adjacent to the filtered one and that such problem has not been resolved by the prior art.

The Applicant has found that to keep in phase the signal at all the wavelengths (except, typically but not necessarily, the filtered one) while they are split between the two optical paths, it is convenient to balance on the bypass path the phase perturbation introduced by the filter on the operating path.

The Applicant believes that the present invention solves the above problem of maintaining a correct phase relationship between the two optical paths being based on a resonant all-pass filter placed along the bypass path and configured to compensate the phase distortion introduced by the filter on the operating path, at least at WDM channels adjacent to the filtered one, while keeping unaffected the amplitude response of the signal when traveling on the bypass path. For the purpose of the present invention, the term 'resonant all-pass filter' refers to a filter having an interference region having one or more associated resonant wavelengths in the wavelength band of interest, and having, in the wavelength band of interest, a wavelength independent amplitude transfer function. A 'resonant wavelength' is a wavelength which interferes constructively in the interference region. Advantageously, said resonant all-pass filter is configured to introduce negligible chromatic dispersion on its resonant wavelengths.

In this way at any wavelength (except possibly the filtered one) the portion of signal that travels through the operating path is kept in phase with the portion of signal that travels through the bypass path, and the signal is entirely recombined by the second switch to the output waveguide.

The Applicant has found that the hitless path switch scheme and method described above may be advantageously applied to a method for hitless tuning the tunable filter optically coupled to the operating path. Accordingly, when the path switch scheme is in State 2, the optical filter on the first path is tuned from the initial state of filtering (e.g. extracting) channel A to the final state of filtering channel B. The entire input signal is directed through the second path during adjustment of the optical filter, until the end of the tuning.

In addition, one of the resonant wavelengths of the all pass filter is tuned from the initial wavelength A to the final one B. During this operation the resonant wavelength of the all-pass filter comes across all the thru channels that are comprised between A and B. Advantageously, the all pass filter, whose chromatic dispersion arises from the resonance, is configured such that the extra chromatic dispersion added to the thru channels in between the range of tuning is negligible with respect to the standard WDM system requirements.

At the end of the tuning operation the switches are reverted to State 1 and consequently the WDM signal is re-addressed to the first optical path and the tunable filter.

According to an aspect of the present invention, a method for hitless optical path switching is provided. The method comprises switching from a first optical path optically coupled to an optical processing device to a second optical path, said first and second optical paths optically connecting, in parallel configuration, a first optical switch to a second optical switch, according to the following steps: directing an optical radiation comprising at least a first operating wavelength through the first optical path to the optical processing device, which is tuned to the first operating wavelength; tuning a resonant all-pass filter optically coupled to the second optical path so as to match, at least at a wavelength adjacent to the first operating wavelength, a phase distortion introduced by the optical processing device on said optical radiation; synchronously actuating the first and the second optical switch so as to switch said optical radiation from the first optical path to the second optical path.

Preferably, in the step of tuning the resonant all-pass filter, a resonant wavelength of the resonant all-pass filter is made equal to the first operating wavelength and, more preferably, the optical processing device has a resonant wavelength equal to the first operating wavelength.

Advantageously, the resonant all-pass filter comprises a single resonator. This simplifies fabrication processing and, more important, helps reducing the chromatic dispersion introduced by the all-pass filter.

More advantageously, the optical processing device comprises a plurality of filtering stages, each stage being coupled to the first optical path via a respective power coupling coefficient, and wherein the power coupling coefficient between the single resonator of the all-pass filter and the second optical path is selected to be equal to the sum of the power coupling coefficients of the plurality of filtering stages of the optical processing device.

Preferably, the resonant all-pass filter comprises micro-ring or racetrack resonators.

Typically the optical processing device is a tunable optical add and/or drop filter.

In one embodiment, the method above further includes the step of shutting off the first operating wavelength.

According to another aspect of the present invention, a method for hitless tuning an optical processing device is provided. The method is based on the method above and further includes, after said step of synchronously actuating the first and the second optical switch, the steps of tuning the optical processing device to a second operating wavelength; tuning the resonant all-pass filter so that a resonant wavelength of the resonant all-pass filter is made equal to the second operating wavelength; and synchronously actuating the first and the second optical switch so as to switch said optical radiation from the second optical path to the first optical path.

In one embodiment, the second operating wavelength is shut off.

According to another aspect of the present invention, an optical processing node is provided. The optical processing node comprises: a first optical switch having a respective input port and a respective first and second output port and a second optical switch having a respective first and second input port and a respective output port, wherein the first and second optical switches are adapted to be actuated synchronously; a first optical path optically connecting the first output port of the first optical switch to the first input port of the second optical switch; a second optical path optically connecting the second output port of the first optical switch to the second input port of the second optical switch; a tunable add and/or drop filter optically coupled to the first optical path and comprising an optical port adapted to drop or add an optical wavelength propagating through the first optical path and a resonant all-pass filter optically coupled to the second optical path.

Preferably, the resonant all-pass filter is adapted to be tuned so as to compensate a phase distortion which the add and/or drop filter is apt to introduce on an optical radiation propagating through the first optical path.

The resonant all-pass filter may preferably comprise a resonant cavity and, more preferably, it may comprise a single resonator.

The tunable add and/or drop filter advantageously comprises a plurality of filtering stages, each stage comprising a resonant cavity optically coupled to the first optical path via a respective power coupling coefficient, and the power coupling coefficient between the single resonator of the resonant all-pass filter and the second optical path is selected to be equal to the sum of the power coupling coefficients of the plurality of filtering stages of the tunable add and/or drop filter.

The resonant all-pass filter may be configured to introduce to an optical signal propagating therethrough a dispersion of less than or equal to 100 ps/nm in absolute value.

The resonant all-pass filter in one preferred embodiment comprises micro-ring or racetrack resonators.

According to a further aspect of the present invention, an optical processing node is provided. The optical processing node comprises: a first optical switch having a respective first input port and a respective first and second output port and a second optical switch having a respective first and second input port and a respective first output port, wherein the first and second optical switches are adapted to be actuated synchronously; a first optical path optically connecting the first output port of the first optical switch to the first input port of the second optical switch; a second optical path optically connecting the second output port of the first optical switch to the second input port of the second optical switch; a tunable optical processing device optically coupled to the first optical path; and a resonant all-pass filter optically coupled to the second optical path; wherein the resonant all-pass filter comprises a single resonator.

In a still further aspect of the present invention, an optical communication system is provided. The optical communication system comprises a transmitter, a receiver, an optical line optically connecting the transmitter and the receiver and an optical processing node according to the above.

BRIEF DESCRIPTION OF THE DRAWINGS

The features and advantages of the present invention will be made clear by the following detailed description of an embodiment thereof, provided merely by way of non-limitative example, description that will be conducted making reference to the annexed drawings, wherein.

DETAILED DESCRIPTION OF THE PREFERRED EMBODIMENT(S) OF THE INVENTION

Figure 1:
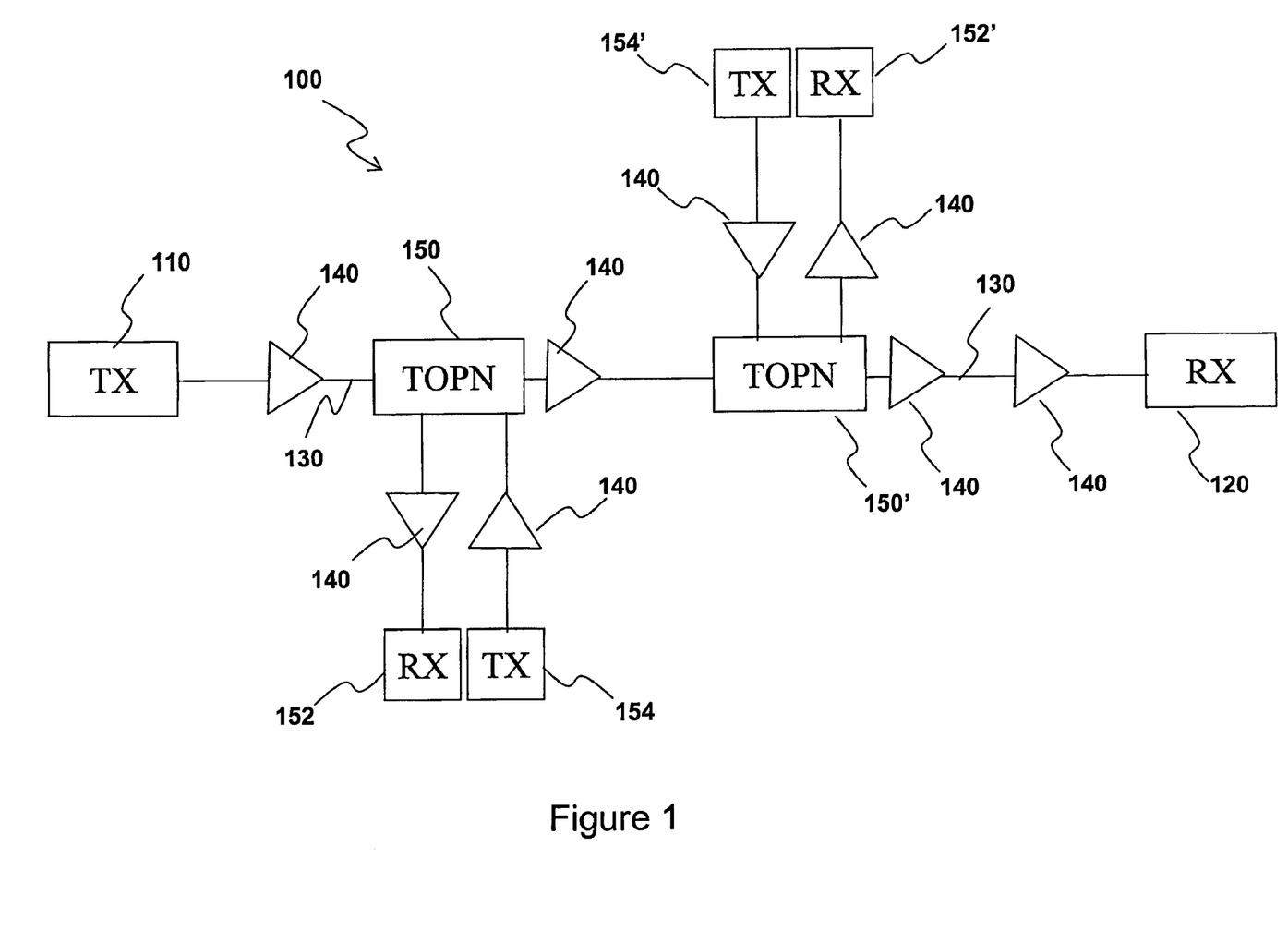
FIG. 1 schematically shows in terms of functional blocks an exemplary optical communication system architecture according to the present invention.

FIG. 1 shows an optical communication system architecture according to a possible embodiment of the present invention.

The optical communication system 100 comprises at least a transmitter 110, a receiver 120 and an optical line 130 which optically connects the transmitter and the receiver. The transmitter 110 is an opto-electronic device apt to emit an optical signal carrying information. It typically comprises at least an optical source (e.g., a laser) apt to emit an optical radiation and at least a modulator apt to encode information onto the optical radiation. Preferably, the transmitter 110 is a WDM transmitter (e.g., either DWDM or CWDM) and the optical signal comprises a plurality of optical wavelengths each carrying modulation-encoded information. The receiver 120 is a corresponding opto-electronic device apt to receive the optical signal emitted by the transmitter and to decode the carried information. The optical line 130 may be formed by a plurality of sections of optical transmission media, such as for example optical fiber sections, preferably cabled. Between two adjacent sections of optical fiber, an optical or optoelectronic device is typically placed, such as for example a fiber splice or a connector, a jumper, a planar lightguide circuit, a variable optical attenuator or the like.

For adding flexibility to the system 100 and improving system functionality, one or a plurality of optical, electronic or opto-electronic devices may be placed along the line 130. In FIG. 1 a plurality of optical amplifiers 140 are exemplarily shown, which may be line-amplifier, optical booster or preamplifier.

According to the present invention, the optical system 100 comprises at least one optical processing node (OPN) 150 optically coupled to the optical line 130 and apt to filter or route or add or drop or regenerate, fully or partially, at least one optical wavelength of the WDM optical signal propagating through the optical line 130. The OPNs are preferably dynamically tunable or reconfigurable (TOPN). In the particular case wherein the optical processing node 150 is an optical add/drop node 150, as shown in FIG. 1, i.e., a node adapted to route or switch or add and/or drop, the routed or switched or dropped or added wavelength(s) may be received or transmitted by further receiver(s) 152 or transmitter(s) 154, respectively, which may be co-located with the OPN node or at a distance thereof. The optical system or network 100 may advantageously comprise a plurality of optical processing nodes. In FIG. 1 a further optical processing node 150' is exemplarily shown, together with its respective optional transmitting and receiving devices 152' and 154'.

An optical system 100 having optical add/drop nodes 150, as shown in FIG. 1, is commonly referred to as an optical network and it is characterized by having a plurality of possible optical paths for the optical signals propagating through it. As exemplarily shown in FIG. 1, a number of six optical paths are in principle possible, which corresponds to all possible choices of the transmitter-receiver pair in FIG. 1 (excluding the pairs belonging to the same node).

According to the present invention, the tunable optical processing node 150 is hitless, being based on a hitless path switch scheme comprising a bypass path which, in turn, includes a resonant all-pass filter.

Figure 2:
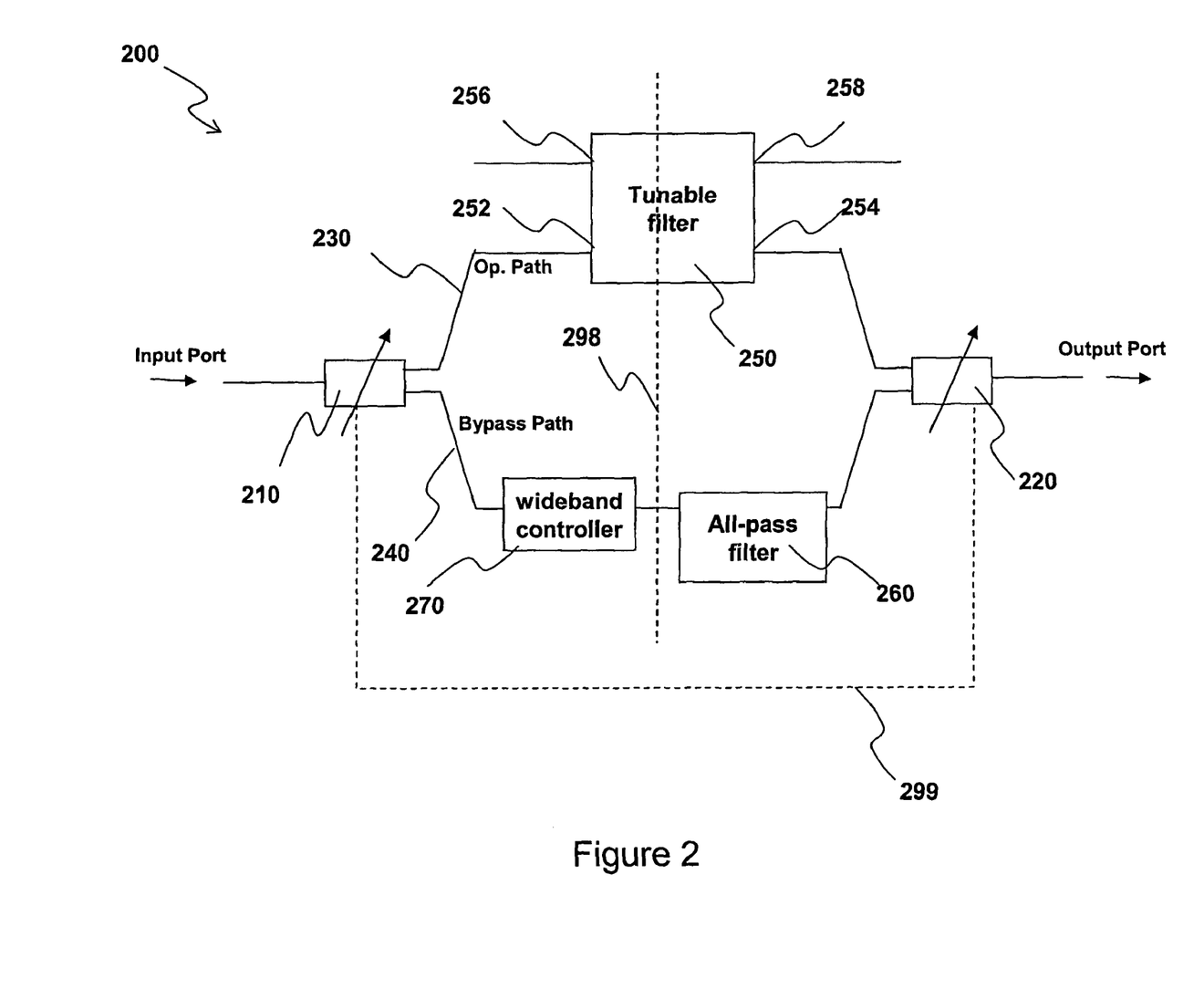
FIG. 2 is a schematic diagram showing in terms of functional blocks an exemplary configuration of a scheme for switching an optical path according to the present invention.

FIG. 2 shows a schematic diagram of a hitless path switch scheme 200 in accordance with an embodiment of the present invention.

The general design scheme of the present invention, shown in FIG. 2, comprises a first optical switch 210 with an input port and a first and a second output port and a second optical switch 220 having a first and a second input port and an output port. Throughout the present description, the terms 'input' and 'output' are used with reference to a conventional direction of propagation of the optical radiation (in FIG. 2 exemplarily from left to right), but, when in operation, the optical radiation may propagate in any direction. A first optical path 230 and a second optical path 240 optically connect in parallel configuration the first optical switch 210 to the second optical switch 220. The first optical path 230 (called 'operating path') connects first output port of the first optical switch 210 to first input port of the second optical switch 220. The second optical path 240 (called 'bypass path') connects second output port of the first optical switch 210 to the second input port of the second optical switch 220. The two optical paths 230 and 240 are preferably optically separated unless in correspondence of the optical switches 210 and 220.

The first optical switch 210 is a splitting device configured to assume alternatively a first and a second state, wherein an optical radiation inputted in the input port is directed, in the first state, substantially solely to the first output port and, in the second state, substantially solely to the second output port. Preferably, the optical switch 210 switches from the first to the second state continuously, i.e. the splitting ratio of the output power of the two output ports switches from 0:100 to 100:0 and vice versa continuously. The second optical switch 220 has the same optical behavior of the first optical switch 210, provided that its output port takes the place of the input port of the first optical switch and its first and second input port take the place of the first and second output ports of the first optical switch. In other words, the second switch 220 is a "time-reversal copy" of the first optical switch 210, i.e. it operates in reverse with respect to the first switch. In one advantageous configuration, the second optical switch 220 is a structurally identical copy of the first optical switch 210 operating in reverse, i.e the second optical switch 220 is a mirror symmetric copy of the first optical switch 210 with respect to the vertical dashed axis 298 in FIG. 2.

The first and second optical switch 210, 220 may be any arbitrary device that meet the above requirements, including variable couplers (such as planar waveguide couplers), variable Y branches, variable polarization rotators/splitters, $\Delta\beta$ switches, alternating $\Delta\beta$ switches, Mach-Zehnder interferometer (MZI) based switches or the like. The first and second optical switch 210, 220 are preferably wavelength-independent over the wavelength band of interest. Typically, the two optical switches are such that the optical radiations inputted in the first and in the second optical path have the same polarization or at least are not orthogonally polarized.

The first and the second optical switch 210 and 220 are configured to be operated in synchronous, as schematically shown in FIG. 2 by the dashed line 299, so as to maintain at any time during operation a symmetrical configuration of the path switch scheme 200. The two optical switches 210, 220 may be actuated by any actuation technique (such as thermo-optic, MEMS actuated, electro-optic, acusto-optic, elasto-optic, stress, etc) so as to switch from the first to the second state and vice versa.

According to the present invention, a tunable optical processing device 250 is optically coupled to the first optical path 230 and it is adapted to receive at least a portion of the optical radiation propagating through the first optical path 230 via an input port 252 and to output a transformed optical radiation via an output port 254 (called 'thru port' 254). The tunable optical processing device 250 may be any optical device adapted to give an optical transformation to the optical radiation propagating across it from the input port 252 to the thru port 254, being the optical transfer function wavelength-dependent in the wavelength band of interest. In the present description, any physical quantity which substantially changes within the optical wavelength band of interest (e.g. 30 nm around 1550 nm) is referred to as being 'wavelength-dependent'. Conversely, a physical quantity which does not substantially change within the optical wavelength band of interest is referred to as being 'wavelength-independent'. In a preferred configuration, the tunable optical processing device 250 is a resonant optical device, i.e. it comprises an interference region having one or more resonant wavelengths, defined as those wavelengths which interfere constructively in the interference region. The distance between two adjacent resonant wavelengths is called free spectral range (FSR). In preferred configurations, the interference region comprises a resonant optical cavity wherein the resonant wavelengths fit an integer number of times on the cavity length comprised in the resonant optical cavity. For example, the resonant optical processing device 250 may comprise linear cavities (i.e. cavities each having a plurality of reflectors), microrings, racetracks, Bragg gratings, photonic band gap cavities, etc. In a preferred configuration, the resonant optical processing device 250 comprises microring or racetrack resonators. The transfer function of the resonant optical processing device 250 is typically characterized by strong wavelength dependence at and in the proximity of a resonant wavelength. Typically, the wavelength currently processed by the optical processing device 250 corresponds to one of its resonant wavelengths.

In the particular embodiment wherein the path switch scheme 200 is comprised within an optical add/drop node 150, as exemplarily shown in FIG. 1, the optical processing device 250 is an optical add and/or drop filter (OADF) having at least a further optical port 256 ('drop port' 256) having the function of routing or dropping or adding, fully or partially, at least an optical wavelength within the optical band of interest propagating in the operating path 230. In a preferred embodiment, the OADF 250 has a still further optical port 258 ('add port' 258) which in combination with the further optical port 256 forms a pair of add and drop ports.

According to the present invention, a resonant all-pass optical filter 260 is optically coupled to the bypass path 240 and it is adapted to introduce a narrowband wavelength dependent phase change so as to match the phase distortion introduced by the tunable optical processing device 250 at least at a wavelength neighboring the wavelength processed by the optical processing device 250. In the present description, a resonant all-pass filter is defined as an optical filter having, in the wavelength band of interest, a wavelength independent amplitude transfer function and a phase transfer function having a wavelength/frequency dependence which exhibits typical resonance induced behavior. The resonant all-pass filter 260 comprises a resonant optical cavity having one or more resonant wavelengths. The all-pass filter 260 is preferably tunable. Strong wavelength dependence of the phase transfer function typically occurs in correspondence of the resonant wavelength(s). Advantageously, the resonant all-pass filter 260 is adapted to be tuned to have at least a resonant wavelength in correspondence of a resonant wavelength of the tunable optical processing device 250 on the opposite path 230. Advantageously, the all-pass filter 260 is adapted to have a FSR selectable to be equal to the FSR of the tunable optical processing device 250 so as to facilitate fabrication and phase matching.

The resonant all-pass filter 260 is adapted to apply the correct phase distortion on channels adjacent to the processed one while leaving substantially unaffected the signal amplitude. Preferably the all-pass filter 260 is designed not to introduce appreciable chromatic dispersion on the channels crossing it, especially on the thru channels upon tuning. The maximum chromatic dispersion introduced by the filter 260 on thru channels, in absolute value, is advantageously less than 100 ps/nm, more preferably less than 20 ps/nm. In a preferred embodiment the all-pass filter 260 comprises a single resonator optically coupled to the bypass path 240 with a suitable coupling coefficient between the single resonator and the optical bypass path 240. In the particular embodiment wherein the tunable optical processing device 250 is comprised of a plurality of resonator-based stages, each stage being coupled to the operating optical path 230 via a respective power coupling coefficient, the all-pass filter 260 preferably comprises a cascade of stages each comprising a single resonator optically coupled to the bypass path 240 with a suitable coupling coefficient between the single resonator and the optical bypass path 240. The number of stages of the all-pass filter 260 may be equal to the number of stages of the processing device 250 or, advantageously, less than that number. In a preferred configuration, the all-pass filter 260 comprises a single resonator having the power coupling coefficient between this single resonator and the bypass path 240 advantageously selected to be equal to the sum of the power coupling coefficients of the stages of device 250. The Applicant has found that placing a single resonator all-pass filter 260 with the above characteristics helps minimizing the chromatic dispersion introduced by the all-pass filter. In fact, the Applicant has found that the chromatic dispersion introduced by a single ring-resonator all pass filter typically reduces when the ring to bus waveguide coupling coefficient increases. The criterion for assessing the suitable coupling coefficient of the all pass filter is that it has to be equal to the sum of the coupling coefficients along the operating path.

A wideband optical phase controller 270 is preferably placed along the second optical path 240 and it is adapted to give in a controlled way a wideband phase change to the optical radiation propagating through the second optical path so as to maintain the overall phase balance between the first and the second optical path. The wideband optical phase controller 270 is functionally different from the narrowband all-pass optical filter 260 in that the phase transfer function of the optical phase controller 270 is substantially constant in the wavelength band of interest. In particular, the phase transfer function of the phase controller 270 has a wavelength dependence which exhibits a change less than 5 degrees on a bandwidth of at least 32 nm. For example, the wideband optical phase controller may be a waveguide phase shifter having a nearby electrode to adjust the phase by electro-optic effect or a nearby micro-heater to adjust the phase by thermo-optic effect. It is noted that the phase shifter of the prior art U.S. Pat. No. 6,035,080 is of the same type of the wideband optical phase controller 270.

A method based on the hitless path switch scheme 200 of FIG. 2 for hitless switching from a first optical path 230 optically coupled to an optical processing device 250 to a second optical path 240 in accordance to the present invention will be described in the following. Reference will be made to elements and corresponding reference numerals of FIG. 2.

As a starting point, during optical processing operation a WDM optical signal is directed, through the operating path 230, to the optical processing device 250 which processes at least a channel of the WDM spectrum. This may be accomplished by acting on the optical switches 210 and 220 so as to direct substantially all the optical radiation inputted in the input port of the optical switch 210 into the first output port of switch 210 optically connected to the first optical path 230 and to direct substantially all the optical radiation received in the first input port of the optical switch 220 into the output port of switch 220.

A resonant all-pass filter 260 optically coupled to the second optical path 240 is tuned so as to match the phase distortion introduced by the optical processing device 250 placed along the first optical path 230, at least in correspondence of the WDM wavelengths neighboring the processed one. This phase matching is achieved at least for the two channels immediately adjacent the processed one and, preferably, for the further two channels adjacent the latter two. Typically, no phase matching is achieved at the processed wavelength. The tuning may be accomplished by any suitable technique such as thermo-optic, electro-optic, acousto-optic, MEMS actuated, elasto-optic and the like. In a preferred configuration, wherein the processing device 250 has resonant wavelengths, the all-pass filter 260 is tuned until one of its resonant wavelengths is equal to one of the current resonant wavelengths of the optical processing device 250. Advantageously, said current resonant wavelength corresponds to the processed wavelength.

Once the resonant all-pass filter 260 is properly tuned, the first and the second optical switch 210 and 220 may be synchronously switched so as to direct the WDM signal from the first optical path to the second optical path. In all the intermediate states during the switching operation, the two portions of WDM signal propagating respectively along the two optical paths remain in a phase relationship which is suitable to properly recombine in the second optical switch 220 so as to be entirely outputted in the output port of the second optical switch without loss and/or distortion. Typically, the processed wavelength, which may not be phase matched and thus may suffer an hit, is turned off before or during the path switch or it is neglected by the optical communication system 100 during the switch.

In one embodiment of the present invention, the hitless path switch method described above may be used, according to the following steps, within a method for hitless tuning an optical processing device 250 from an initial processing wavelength $\lambda_1$ to a final processing wavelength $\lambda_2$, both belonging to a WDM signal, wherein said optical processing device 250 is placed along the first optical path 230. Advantageously, said method is applied to tune an optical add and/or drop filter 250, without any power loss and/or distortion on thru channels during tuning operation. Preferably, the thru channels are also subject to low chromatic dispersion during the entire tuning operation of the optical processing device 250.

In the initial operating condition, a WDM signal comprising the initial wavelength $\lambda_1$ is directed via the first optical path 230 to the optical processing device 250 which is tuned to process the initial wavelength. During this processing state, the whole WDM signal is addressed by first switch 210 into first optical path 230. For example, in the case wherein a tunable add/drop filter 250 is placed along the first optical path, it may extract $\lambda_1$ via the drop port 256 and optionally add the same wavelength with a new information content through the add port 258, as is known in the art. The channels centered at wavelengths different from $\lambda_1$ may travel through first path 230 without any substantial power loss, and may be addressed, possibly together with the added channel, by the second switch 220 to output port. As explained above, the channels adjacent to the processed one ($\lambda_1$) typically suffer a certain phase distortion, due to the presence of the tunable processing device 250.

Optionally and advantageously, the initial and final processing wavelengths, $\lambda_1$, $\lambda_2$, are preferably shut off before or at a certain stage of the tuning operation of the optical processing device 250.

The resonant all pass filter 260 on bypass optical path 240 is tuned so as to match the phase distortion of the optical filter 250 placed along the first optical path 230 on the channels adjacent to $\lambda_1$, as explained above. Preferably, the resonant all-pass filter 260 is made to resonate at the initial wavelength $\lambda_1$.

After the tuning of the all-pass filter 260, the first and the second optical switch 210, 220 are synchronously switched so as to direct the WDM signal from the first optical path 230 to the second optical path 240. The reverting operation typically requires few milliseconds (between about 0.5 and 2 ms), and during this period of time the thru channels remain addressed to the output port of the second switch 220, without any substantial power loss. For example, if the tunable filter 250 and the all-pass filter 260 are both tuned at the same resonant wavelength $\lambda_1$, the fraction of signal traveling through operating path 230 is affected by the same phase distortion as the fraction traveling trough bypass path 240, and the whole optical power is correctly recombined by the second switch 220 into its output port. At the end of the switching operation the whole WDM signal is addressed by first switch 210 into second optical path 240, where the all pass filter 260 is placed.

By some physical excitation (thermo-optic, electro-optic, stress . . . ) the tunable processing device 250 is then adjusted to process (e.g. extract and/or insert) the new channel centered at the final wavelength $\lambda_2$. To keep the correct phase relationship between optical paths 230 and 240, also the all pass filter 260 is tuned to resonate at $\lambda_2$. In tuning the all pass filter 260 from $\lambda_1$ to $\lambda_2$, it will resonate at all the thru wavelengths between $\lambda_1$ and $\lambda_2$. But, as described above, the all pass filter 260 is advantageously configured to introduce negligible losses and, preferably, negligible chromatic dispersion on its resonant wavelength and the adjacent ones, and so the thru channels remain substantially unaffected by the all pass filter tuning.

At the end of the tuning operation the first and the second optical switch 210, 220 are gradually synchronously reverted to the initial condition, i.e. to direct the WDM signal from the second optical path 240 back again to the first optical path 230. During this switching phase, since the tunable processing device 250 and the all pass filter 260 are both tuned at the same wavelength $\lambda_2$, the fraction of signal traveling trough path 230 is affected by the same phase distortion as the fraction traveling trough path 240, and the whole optical power is correctly recombined by the second switch 220 into its output port.

At the end of the switching operation all the WDM signal is addressed by switch 210 again into optical path 230, where the optical processing device 250 may now process the new wavelength $\lambda_2$. In case the channels at $\lambda_1$ and $\lambda_2$ were shut off, now they can be re-switched on. In case of an OADF 250, in the final operating condition it extracts $\lambda_2$ from the drop port 256 and possibly adds it with a new information content to the add port 258. During the entire operation, the thru channels remain substantially unaffected.

Figure 3:
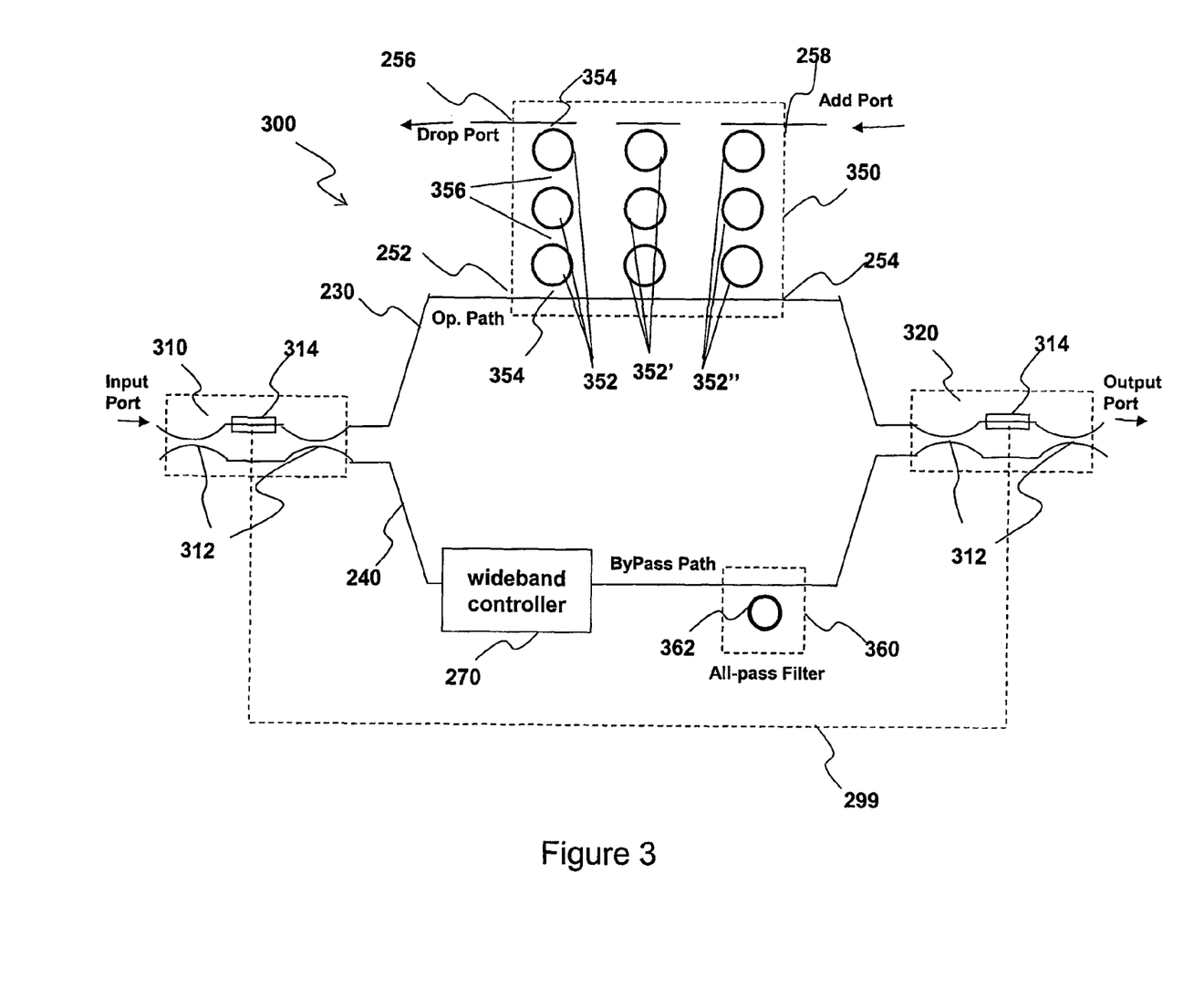
FIG. 3 is a schematic diagram showing in terms of functional blocks an exemplary configuration of a hitless add and/or drop device according to the present invention.

With reference now to FIG. 3, an exemplary realization of a tunable hitless optical add and/or drop multiplexing device 300 in accordance with the present invention will now be described. Where appropriate, the same reference numerals of FIG. 2 for like elements have been used and, for these elements, reference is made to the description above.

The first and second optical switch 310, 320 are identical MZI-based optical switches, each comprising a balanced MZI having a pair of identical 3-dB optical couplers 312 and a controllable phase shifter 314 (for example thermally actuated) along the arm corresponding to the first optical path 230.

The tunable optical add and/or drop filter (OADF) 350 on the operating path 230 is a resonant-type optical filter comprising microring resonators 352, 352' and 352". In the exemplary embodiment of FIG. 3, the tunable OADF 350 comprises three stages 352, 352' and 352", each stage comprising three series-coupled microring resonators. The first stage 352 is adapted to drop a wavelength from the first optical path 230 and the third stage 352" is adapted to add a further wavelength, preferably equal to the dropped wavelength, into the first optical path 230. Middle stage 352' is adapted to clean the thru channels.

Exemplarily, a third order Chebyshev optical filter 350 has been advantageously designed to meet the following specifications: FSR greater than or equal to about 4 THz (32 nm at 1550 nm), passband (at drop port 256) greater than or equal to about 30 GHz with ripple less than about 0.15 dB, extinction (at drop port 256) on adjacent WDM channels (100 GHz spacing) greater than or equal to about 30 dB, rejection (at thru port 254) for the filtered channel greater than or equal to about 30 dB.

The three stages are identical. Within each stage, the power coupling coefficients of the couplers between bus-waveguides and microring-waveguides (couplers 354) are equal to about 5.06% and the power coupling coefficients of the couplers between adjacent rings (couplers 356) are equal to about 0.066%.

The OADF 350 can be realized by any known optical material system, such as exemplarily silicon waveguides buried in a $SiO_2$ cladding. This latter high index contrast waveguide allows fabricating microring resonators with very small radius and negligible bending losses. Small ring radius (e.g. not greater than about 3 µm) advantageously gives large FSR, preferably larger than 32 nm (equal to 4 THz at about 1550 nm, suitable for 40 WDM channels 100 GHz-spaced in C-band). In this exemplary embodiment, the bus and the ring waveguides are about 450 nm wide and about 220 nm high, the ring radius is about 2.7 µm, the bus to ring gap is about 100 nm wide and the ring to ring gap is about 400 nm wide.

The OADF 350 may be thermally tuned by micro-heater placed above the microrings, over the $SiO_2$ upper cladding.

Figure 4A:
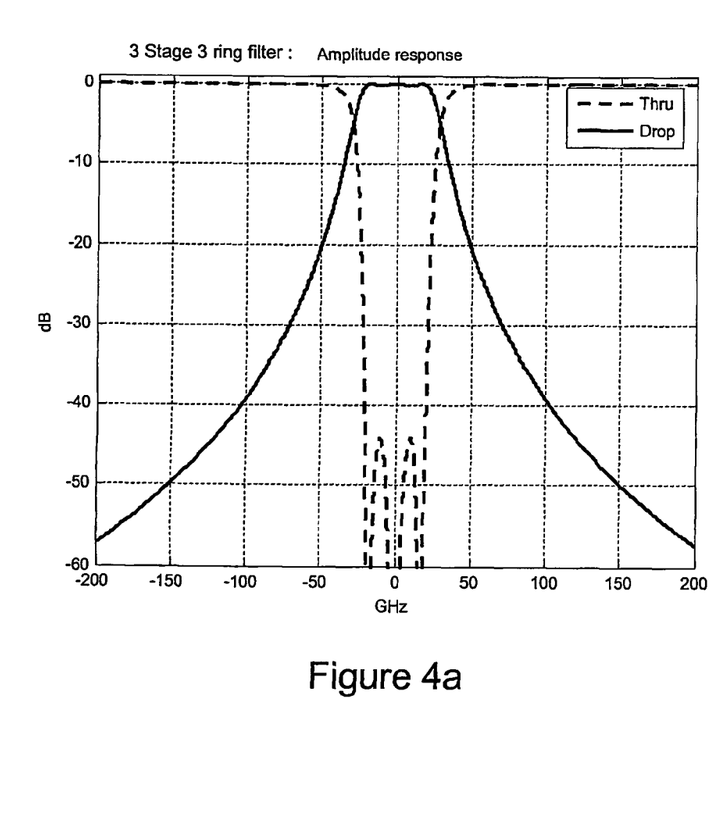
FIGS. 4a and 4b show respectively amplitude and phase response of the add/drop filter comprised in the add/drop device of FIG. 3.
Figure 4B:
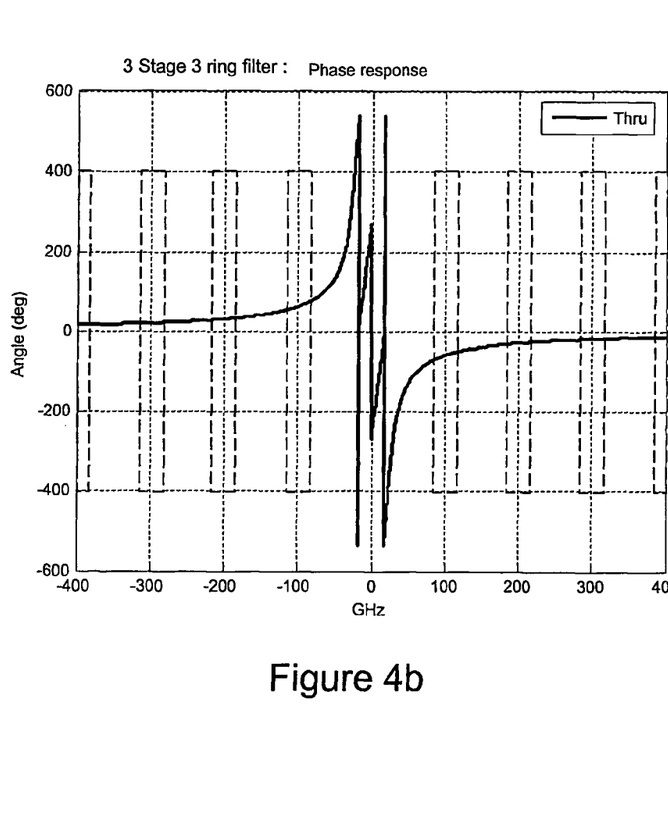

In FIGS. 4a and 4b there are respectively shown the calculated amplitude (thru port 254 and drop port 256) and phase (thru port 254) response of the three stage add and/or drop filter 350 described above.

In accordance with the present invention, a tunable resonant all-pass filter 360 placed along the bypass path 240 is adapted to be tuned to match the phase distortion introduced by the optical filter 350 and shown in FIG. 4b.

In one embodiment the all pass filter 360 comprises a single microring resonator 362, with FSR substantially equal to the FSR of the tunable OADF 350 and having bus-to-ring power coupling coefficient substantially equal to the coupling coefficient of a single stage of the OADF 350 (e.g. 5.06% in the example above) times the number of stages of the OADF 350 (three in the example above). The resulting power coupling coefficient is equal to about 16%. Exemplarily, the ring waveguide is about 450 nm wide and about 220 nm high, the ring radius is about 2.7 µm, the bus to ring gap is about 40 nm wide. Using, in place of the microring resonator 362, a racetrack having the section of straight waveguide coupled to the bus-waveguide 240 of about 950 nm of length and a radius of curvature of about 2.4 µm, it is possible to increase the gap to about 90 nm.

Figure 5A:
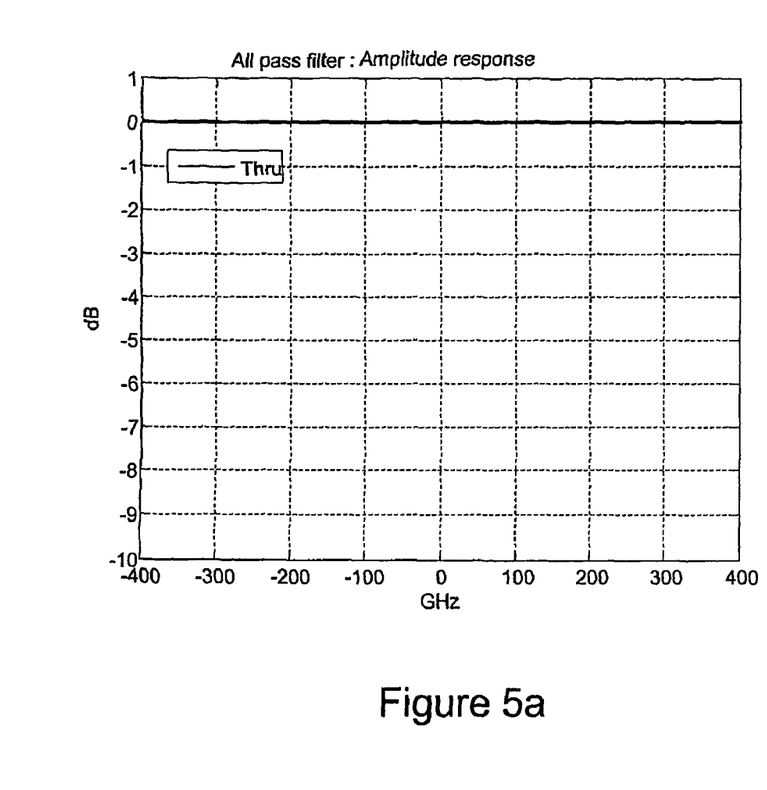
FIGS. 5a-d show respectively amplitude, phase, group delay and dispersion spectrum of the resonant all-pass filter comprised in the add/drop device of FIG. 3.
Figure 5B:
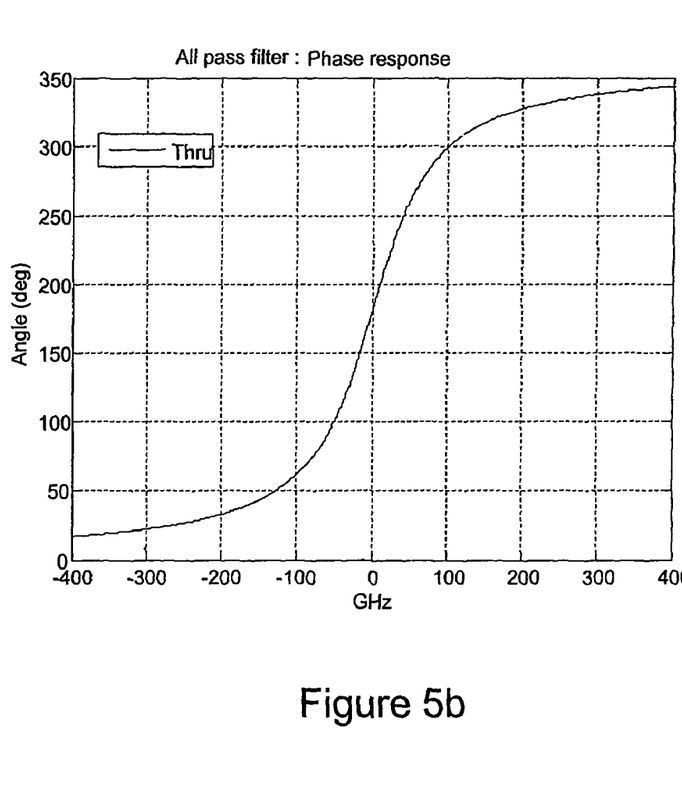

The amplitude and phase response of the all-pass filter 360 described above have been evaluated by a transfer matrix method and are plotted in FIGS. 5a and 5b, respectively, for a frequency range corresponding to the first four channels (on each side) adjacent to the filtered one (100 GHz spacing). It is noted that the all-pass filter introduces no extra losses on the channels (FIG. 5a) and that a phase excursion of about 250 degrees is experienced in a narrow band of about 200 GHz (FIG. 5b).

Figure 5C:
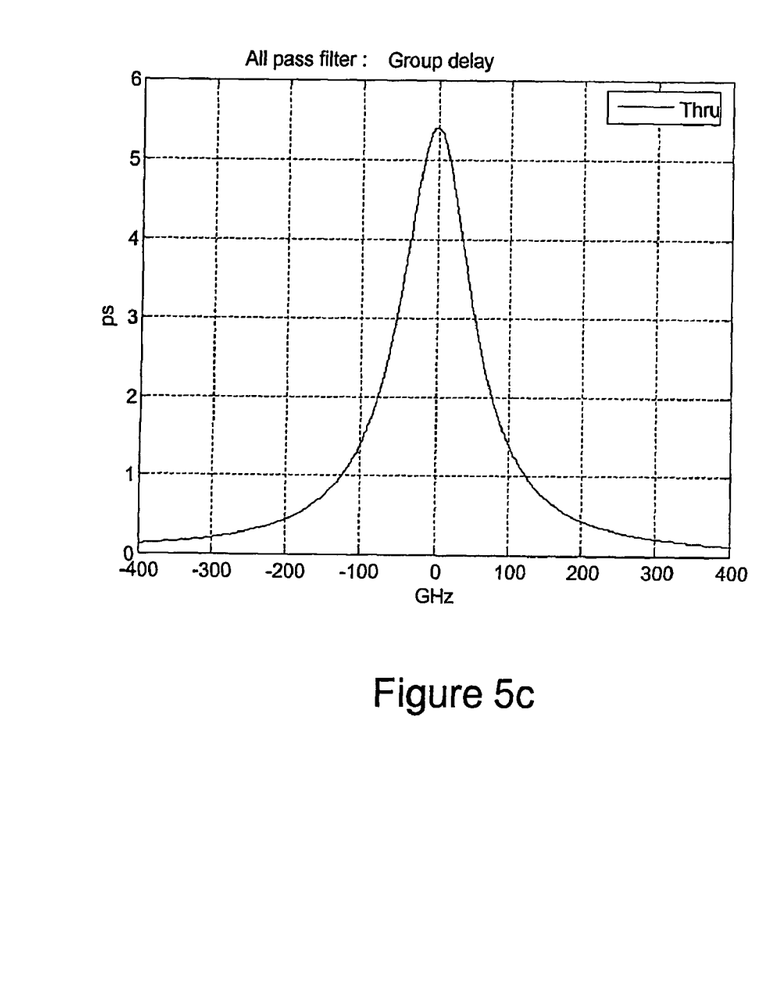
Figure 5D:
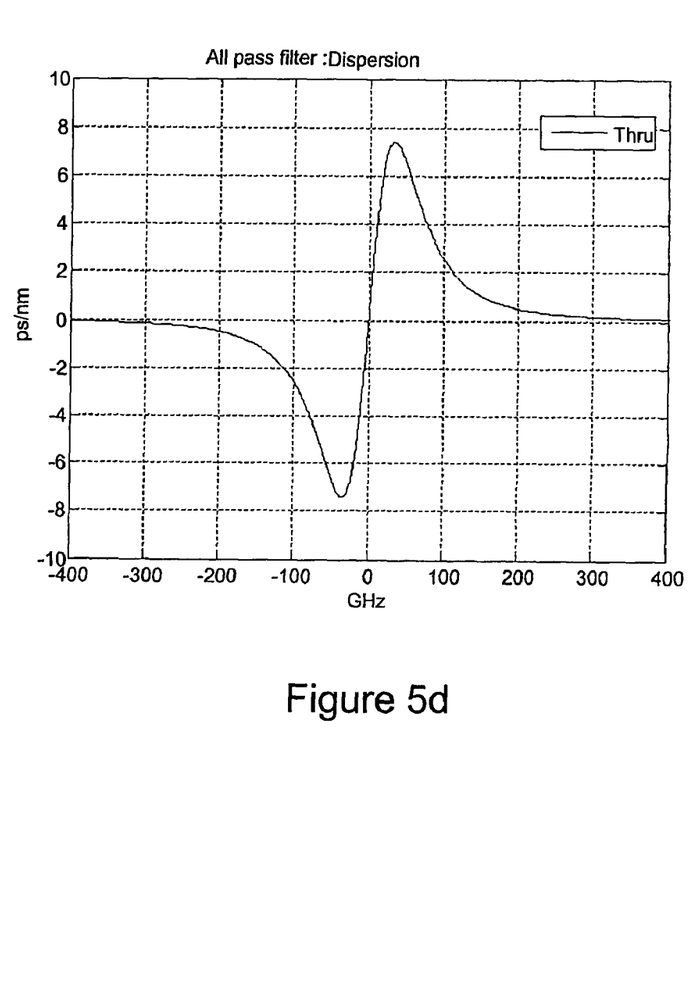

In FIGS. 5c and 5d the corresponding group delay and chromatic dispersion introduced by the above all-pass filter 360 are respectively plotted. The maximum value of chromatic dispersion introduced by the exemplary all-pass filter 360 is about ±7 ps/nm; which is a value widely acceptable in most WDM systems.

Figure 6A:
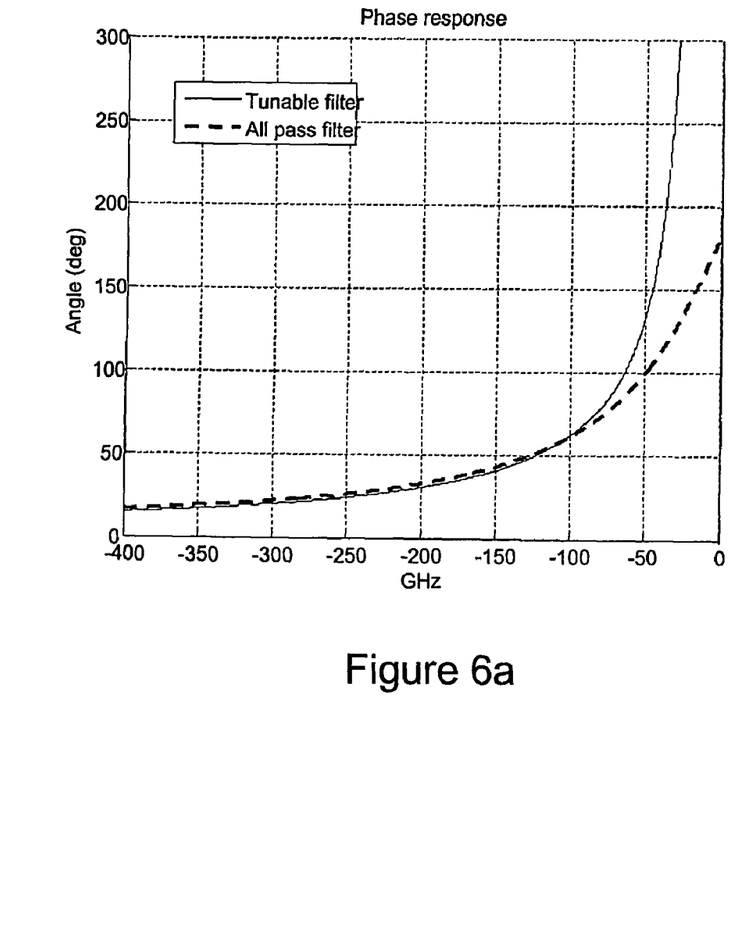
FIGS. 6a and 6b show respectively a comparison and the difference of the phase responses shown in FIGS. 4b and 5b.
Figure 6B:
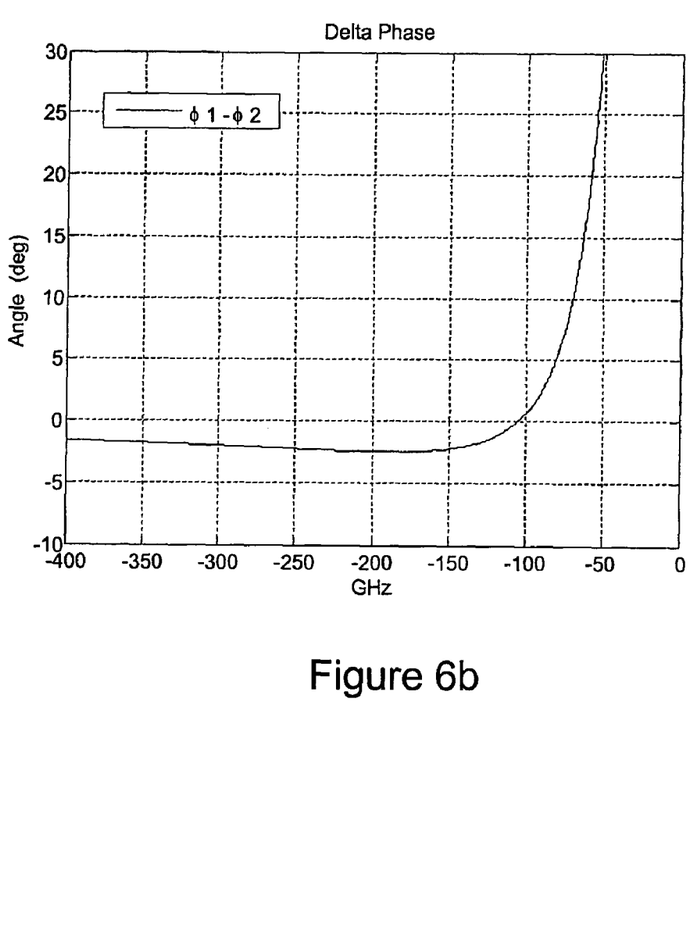

In FIG. 6a the phase responses of the above described tunable OADF 350 and all-pass filter 360 are compared. In FIG. 6b the corresponding difference between the phase perturbations along the two optical paths 230, 240 is plotted. The phase difference remains in the range of few degrees (no greater than about 5 degrees) for the four channels adjacent to the filtered one. The same holds for the four channels on the opposite side with respect to the filtered one.

Figure 7:
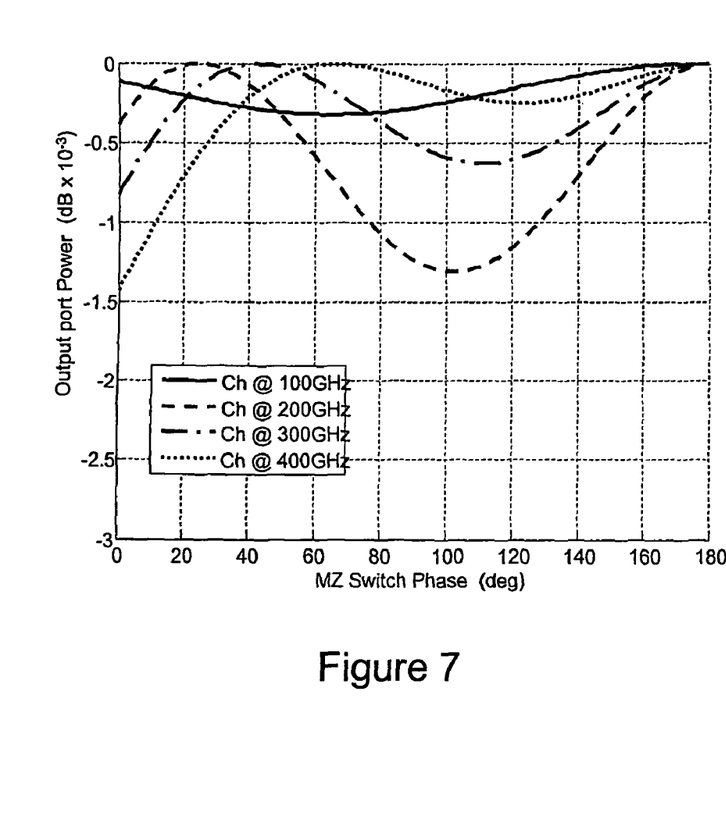
FIG. 7 shows calculated results of the hit loss of the add/drop device of FIG. 3.

In FIG. 7 it is shown the calculated (transfer matrix technique) power (in units of $10^{-3}$ dB) at the output port of the second optical switch 320 of the OADM device 300 of FIG. 3 for the four channels adjacent to the filtered one on one side (respectively 100 GHz, 200 GHz, 300 GHz, 400 GHz apart from resonant frequency) during the transition from bypass state (signal traveling through bypass path 240) to processing state (signal traveling through operating optical path 230) in presence of the phase compensation by the single ring all-pass filter 360. The horizontal axis shows the phase shift introduced by the phase shifter 314 of FIG. 3, wherein a null phase shift corresponds to the bypass state, while a 180° phase shift corresponds to the processing state. The four channels adjacent to the filtered one suffer a power loss less than or equal to about 0.002 dB (0.5%) during transition from second optical path to first optical path (and vice versa). This amount of loss is tolerable in most WDM systems and represents a great improvement with respect to prior art solutions.

Figure 8:
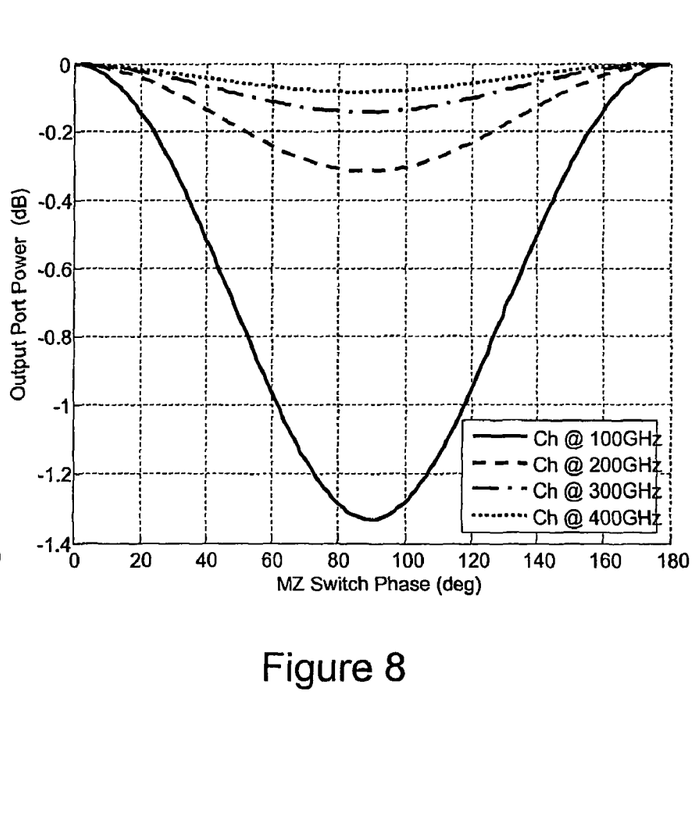
FIG. 8 shows calculated results of the hit loss of a comparative add/drop device which does not make use of the present invention.

As a comparative example, in FIG. 8 it is shown the calculated power at the output port of the second optical switch 320 for the four adjacent channels during the same switching transition of FIG. 7, now without compensation of the phase distortion, i.e., without the all-pass filter 360. It is noted that the wideband phase controller 270 is present and maintains the wideband phase balance between the two optical paths. The channel adjacent to the filtered one suffers a loss of about 1.3 dB during switching transition from second path to first path and vice versa. This amount of power loss is not tolerable in nowadays WDM systems.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for switching from a first optical path optically coupled to an optical processing device to a second optical path, said first and second optical paths optically connecting, in parallel configuration, a first optical switch to a second optical switch, comprising:
   directing a wavelength-division multiplexed (WDM) optical signal comprising at least a first operating wavelength through the first optical path to the optical processing device which is tuned to the first operating wavelength;
   tuning a resonant all-pass filter optically coupled to the second optical path to have a resonant wavelength corresponding to the first operating wavelength so as to match, at least at a wavelength adjacent to the first operating wavelength, a phase distortion introduced by the optical processing device on said optical radiation, the resonant all-pass filter having a wavelength-independent amplitude transfer function in a wavelength band including the WDM optical signal; and
   synchronously actuating the first and the second optical switches so as to switch said optical radiation from the first optical path to the second optical path.

2. The method of claim 1, wherein, in the step of tuning the resonant all-pass filter, a resonant wavelength of the resonant all-pass filter is made equal to the first operating wavelength.

3. The method of claim 2, wherein the optical processing device has a resonant wavelength equal to the first operating wavelength.

4. The method of claim 1, wherein the resonant all-pass filter comprises a single resonator.

5. The method of claim 4, wherein the optical processing device comprises a plurality of filtering stages, each stage being coupled to the first optical path via a respective power coupling coefficient, and wherein the power coupling coefficient between the single resonator of the resonant all-pass filter and the second optical path is selected to be equal to the sum of the power coupling coefficients of the plurality of filtering stages of the optical processing device.

6. The method of claim 1, wherein the resonant all-pass filter comprises micro-ring or racetrack resonators.

7. The method of claim 1, wherein the optical processing device is a tunable optical add and/or drop filter.

8. The method of claim 1, further comprising shutting off the first operating wavelength.

9. The method of claim 1, further comprising, after said step of synchronously actuating the first and the second optical switches, the steps of:
   tuning the optical processing device to a second operating wavelength;
   tuning the resonant all-pass filter so that a resonant wavelength of the resonant all-pass filter is made equal to the second operating wavelength; and
   synchronously actuating the first and the second optical switches so as to switch said optical radiation from the second optical path to the first optical path.

10. The method of claim 9, further comprising shutting off the second operating wavelength.

11. The method of claim 1, further comprising tuning a wideband optical phase controller coupled to the second path to maintian a phase balance between the first and second optical paths in a wavelength band including the WDM optical signal.

12. An optical processing node comprising:
   a first optical switch having an input port and first and second output ports; and
   a second optical switch having first and second input ports and an output port,
   wherein the first and second optical switches are configured to be actuated synchronously;
   a first optical path optically connecting the first output port of the first optical switch to the first input port of the second optical switch;
   a second optical path optically connecting the second output port of the first optical switch to the second input port of the second optical switch;
   a tunable add and/or drop filter optically coupled to the first optical path and comprising an optical port configured to drop or add at least a first operating wavelength of a wavelength-division multiplexed (WDM) optical signal propagating through the first optical path; and
   a resonant all-pass filter optically coupled to the second optical path and being tunable to have a resonant wavelength corresponding to the first operating wavelength so as to match a phase distortion which the add and/or drop filter introduces on an optical radiation propagating through the first optical path, the resonant all-pass filter having a wavelength-independent amplitude transfer function in a wavelength band including the WDM optical signal.

13. The optical processing node of claim 12, wherein the resonant all-pass filter comprises a resonant cavity.

14. The optical processing node of claim 12, wherein the resonant all-pass filter comprises a single resonator.

15. The optical processing node of claim 14, wherein the tunable add and/or drop filter comprises a plurality of filtering stages, each stage comprising a resonant cavity optically coupled to the first optical path via a respective power coupling coefficient, and wherein the power coupling coefficient between the single resonator of the resonant all-pass filter and the second optical path is selected to be equal to the sum of the power coupling coefficients of the plurality of filtering stages of the tunable add and/or drop filter.

16. The optical processing node of claim 12, wherein the resonant all-pass filter is configured to introduce to an optical signal propagating therethrough a dispersion of less than or equal to 100 ps/nm in absolute value.

17. The optical processing node of claim 12, wherein the resonant all-pass filter comprises micro-ring or racetrack resonators.

18. An optical communication system comprising a transmitter, a receiver, an optical line optically connecting the transmitter and the receiver and an optical processing node according to claim 12.

19. The optical processing node of claim 12, further comprising a wideband optical phase controller optically coupled to the second optical path and being tunable to maintain a phase balance between the first and second optical paths in a wavelength band including the WDM optical signal.

* * * * *